US012722331B1

(12) United States Patent
Simonds

(10) Patent No.: US 12,722,331 B1
(45) Date of Patent: Sep. 1, 2026

(54) METHOD AND APPARATUS FOR FORMING GOLF BALL DUAL CORES

(71) Applicant: Acushnet Company, Fairhaven, MA (US)

(72) Inventor: Vince Simonds, Brimfield, MA (US)

(73) Assignee: Acushnet Company, Fairhaven, MA (US)

( * ) Notice: Subject to any disclaimer, the term of this patent is extended or adjusted under 35 U.S.C. 154(b) by 158 days.

(21) Appl. No.: 18/899,809

(22) Filed: Sep. 27, 2024

Related U.S. Application Data

(62) Division of application No. 18/086,953, filed on Dec. 22, 2022, now Pat. No. 12,485,590.

(60) Provisional application No. 63/293,863, filed on Dec. 27, 2021.

(51) Int. Cl.

| | |
|---|---|
| ***B29C 43/20*** | (2006.01) |
| ***A63B 45/00*** | (2006.01) |
| ***B29C 43/00*** | (2006.01) |
| ***B29C 43/52*** | (2006.01) |
| *B29K 9/06* | (2006.01) |
| *B29L 31/54* | (2006.01) |

(52) U.S. Cl.
CPC ............ *B29C 43/203* (2013.01); *A63B 45/00* (2013.01); *B29C 43/003* (2013.01); *B29C 43/52* (2013.01); *B29K 2009/06* (2013.01); *B29L 2031/546* (2013.01)

(58) Field of Classification Search
CPC ....... B29C 43/18; B29C 43/52; B29C 43/003; B29L 2031/546
See application file for complete search history.

(56) References Cited

U.S. PATENT DOCUMENTS

2017/0361510 A1* 12/2017 Simonds .............. B29C 43/027

* cited by examiner

*Primary Examiner* — Alison L Hindenlang
*Assistant Examiner* — Debjani Roy
(74) *Attorney, Agent, or Firm* — Bradley Arant Boult Cummings LLP

(57) ABSTRACT

Mold assemblies and methods for compression molding dual cores of golf balls are provided. The mold assemblies and methods for molding dual cores allow for direct and independent temperature control of both the shell forming plate and the mold cavity plate during manufacturing of the dual cores. The shell forming plate and the mold cavity plate are temperature-controlled by independent platens. The ability to precisely control the temperature of the shell forming plate independent from the temperature of the mold cavity plate prevents under and overcuring of the outer core layer, which can adversely affect core durability, concentricity, and manufacturing yields.

20 Claims, 3 Drawing Sheets

METHOD AND APPARATUS FOR FORMING GOLF BALL DUAL CORES

CROSS-REFERENCE TO RELATED APPLICATIONS

This application is a divisional of U.S. patent application Ser. No. 18/086,953, filed Dec. 22, 2022, now pending, the entire disclosure of which is incorporated by reference herein.

FIELD OF THE INVENTION

The present disclosure relates generally to a method and apparatus for forming dual cores of golf balls. More particularly, the present disclosure relates to a method and apparatus for compression molding an outer shell of a dual core that allows for independent temperature control of the shell forming plate and the mold cavity during manufacturing. The improved method and apparatus optimizes the curing profile preventing over and under curing of the core, which can adversely affect concentricity and the performance of the resulting golf ball.

BACKGROUND OF THE INVENTION

Multi-layer cores, such as dual cores, are often used by golf ball manufacturers because dual cores create golf ball designs that optimize spin rate profiles while maintaining launch vectors (velocity and launch angles). Conventional mold assemblies for forming dual cores typically include a bottom mold plate, a top mold plate, and a center mold plate. The bottom and top mold plates include a plurality of mating cavities that form spheres, which are sized according to the desired core size. The center mold plate includes a plurality of protrusions on opposite sides thereof for corresponding with the cavities of the top and bottom mold plates. The dual cores are formed by placing the core outer layer material in the cavities of the bottom and top mold plate. Then the center mold plate is moved into alignment with the top and bottom mold plates such that the protrusions are located in alignment with the cavities. Once the mold assembly is in position, the top and bottom mold plates are moved into a press, heated, and compressed. After the outer layer material has been pre-formed into hemispheres, the mold assembly is removed from the press and ball centers are placed within the hemispherical cups. The top and bottom mold plates are then placed back into the press and are heated and compressed again to form the dual core.

While the prior art mold assemblies are able to form cores having multiple layers, the conventional mold assemblies do not allow for the manufacturer to independently control and rapidly modulate the temperature of the shell forming plate (i.e., the center mold plate) and the mold cavities (i.e., the top and bottom mold plates). Rather, the shell forming plate is passively and indirectly heated through the mold and the material used to form the hemispherical shells. Conventional mold assemblies do not allow for direct temperature control of the shell forming plate itself. As such, it is difficult for golf ball manufacturers to precisely control the temperature of the center mold plate and the subsequent curing of the core outer layer material. Without precise control over the curing of the core, variances in the manufacturing process may result in decreased core durability and a golf ball with a certain degree of center shift. Such lack of concentricity or centeredness of the golf ball layers can result in performance inadequacies. In fact, if the inner core of a dual core golf ball is just 40/1000 of an inch off-center, shot dispersion can increase.

U.S. Publication No. 2017/0361510 discloses a method and apparatus for molding dual cores for a golf ball. A headblock is pressed against a mold tool where a hemispherical protrusion of the headblock compresses a slug within a first hemispherical cavity to form a first half shell outer core component. An inner core sphere is placed within the first half shell outer core component. An upper section of the mold tool is assembled onto a lower section of the mold tool to place a second half shell outer core component within an upper hemispherical cavity over the inner core sphere within the first hemispherical cavity to form a dual core component for a golf ball. While U.S. Publication No. 2017/0361510 discloses the use of temperature-controlled platens within the mold tool, the platens are electrically heated and do not provide any ability to thermally cycle the temperature of the mold tool quickly using heated and cooled water. In fact, U.S. Publication No. 2017/0361510 specifically states that the disclosed apparatus eliminates steam plant and cooling water.

Accordingly, there remains a need for an improved method and mold assembly for forming dual cores of golf balls that provides independent and faster thermal cycling of the shell forming and mold cavity plates so that a golf ball manufacturer can precisely control the curing of the outer hemispherical shells of the core.

SUMMARY OF THE INVENTION

The problems expounded above, as well as others, are addressed by the following inventions, although it is to be understood that not every embodiment of the inventions described herein will address each of the problems described above.

In some embodiments, a mold assembly for forming a golf ball component is provided, the mold assembly including a shell forming plate having an upper surface and a lower surface, wherein the lower surface includes a plurality of hemispherical protrusions extending therefrom, a first platen operatively connected to the upper surface of the shell forming plate and configured to maintain the shell forming plate at a first temperature, wherein the first platen is temperature-controlled by thermally cycled water, a mold cavity plate positioned below the shell forming plate and having an upper surface and a lower surface, wherein the upper surface includes a plurality of hemispherical cavities configured for insertion of a preform and aligned with the plurality of hemispherical protrusions, a second platen operatively connected to the lower surface of the mold cavity plate and configured to maintain the mold cavity plate at a second temperature that is lower than the first temperature, wherein the second platen is temperature-controlled by a source independent from the thermally cycled water, and a press ram operatively connected to the mold cavity plate and configured to press the mold cavity plate against the shell forming plate to form a golf ball component under sufficient heat and pressure.

In this embodiment, the first platen may include an internal reservoir to receive and circulate a supply of water at a desired temperature. In other embodiments, the first temperature is about 215° F. or less and the second temperature is about 200° F. or less. In further embodiments, the second temperature is at least about five degrees lower than the first temperature. In still other embodiments, the second platen is temperature-controlled by thermally cycled water from a source independent from a source providing the thermally cycled water to the first platen. In yet further embodiments, the golf ball component is a hemispherical half shell for an outer core layer.

In other embodiments, a method of forming a hemispherical shell for a dual core of a golf ball is provided, the method including depositing a preform, such as an uncured polybutadiene composition, into a hemispherical cavity of a mold cavity plate, loading the mold cavity plate into a mold assembly, the mold assembly including a shell forming plate mounted above the mold cavity plate, the shell forming plate including a hemispherical protrusion extending therefrom, heating the shell forming plate to a first temperature via a first platen operatively connected thereto, wherein the first platen is temperature-controlled by thermally cycled water, heating the mold cavity plate to a second temperature via a second platen operatively connected thereto, wherein the second platen is temperature-controlled by a source independent from the thermally cycled water, and wherein the second temperature is lower than the first temperature, aligning the hemispherical protrusion of the shell forming plate with the hemispherical cavity of the mold cavity plate, and pressing the mold cavity plate against the shell forming plate, wherein the hemispherical protrusion compresses the preform in the hemispherical cavity to form a first hemispherical shell for the dual core.

In some embodiments, the heating step for the shell forming plate further includes circulating heated water through a series of channels disposed in the first platen. In other embodiments, the first temperature is about 215° F. or less and the second temperature is about 200° F. or less. In further embodiments, the method may include cooling the shell forming plate by circulating chilled water through a series of channels disposed in the first platen. In still further embodiments, the second platen is temperature-controlled by thermally cycled water from a source independent from a source providing the thermally cycled water to the first platen. In yet other embodiments, the second temperature is at least about ten degrees lower than the first temperature.

In still other embodiments, a method of forming a dual core for a golf ball is provided, the method including forming an inner core layer; forming two hemispherical shells by: depositing a preform into a hemispherical cavity of a mold cavity plate, loading the mold cavity plate into a mold assembly, the mold assembly including a shell forming plate mounted above the mold cavity plate, the shell forming plate including a hemispherical protrusion extending therefrom, heating the shell forming plate to a first temperature via a first platen operatively connected thereto, wherein the first platen is temperature-controlled by thermally cycled water, heating the mold cavity plate to a second temperature via a second platen operatively connected thereto, wherein the second platen is temperature-controlled by a source independent from the thermally cycled water, and wherein the second temperature is lower than the first temperature, and pressing the mold cavity plate against the shell forming plate, wherein the hemispherical protrusion compresses the preform in the hemispherical cavity to form a hemispherical shell for the dual core; assembling the two hemispherical shells as an outer core layer around the spherical inner core layer; and curing the two hemispherical shells to form a unitary outer core layer by compression molding the two hemispherical shells around the spherical inner core layer to form the dual core.

In some embodiments, the dual core has a center shift relative to a thickness of the outer core layer of about 8 percent or less. In other embodiments, the first temperature ranges from about 50° F. to about 210° F. and the second temperature ranges from about from about 50° F. to about 200° F. In further embodiments, the second temperature is at least about ten degrees lower than the first temperature. In still further embodiments, the method may further include cooling the dual core. In yet further embodiments, the method may further include circulating heated water through a series of channels disposed in the first platen.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
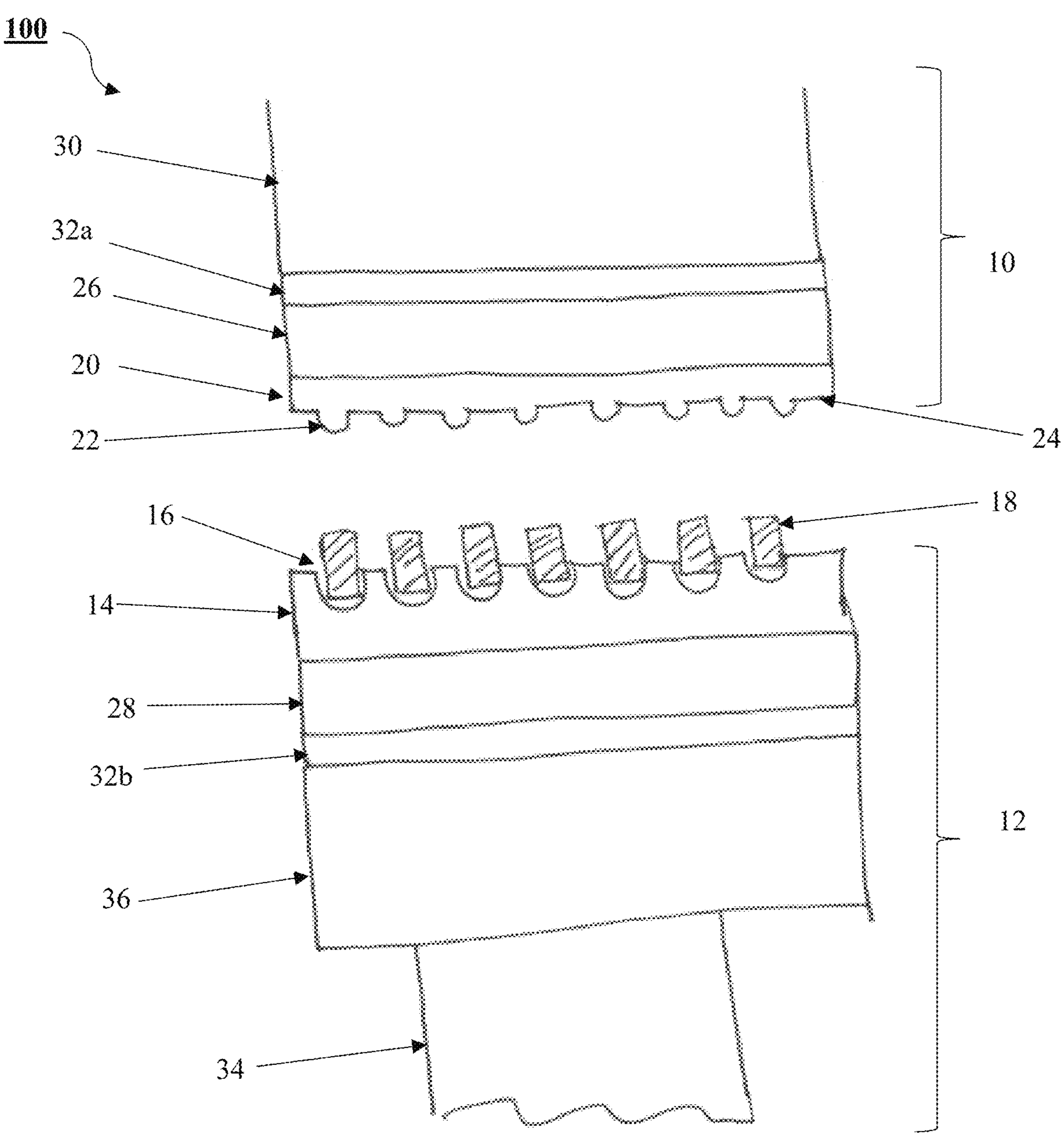
FIG. 1 is a schematic diagram of a mold assembly according to an exemplary embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The term "plurality" shall generally mean more than one.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides an apparatus and method for compression molding dual cores of golf balls that allows for direct and independent temperature control of both the shell forming plate and the mold cavity plate during manufacturing of the dual cores. Independent control of the temperature of the two mold plates—the shell forming plate and the mold cavity plate—enables a manufacturer to precisely control the curing of the hemispherical shells that are configured to receive inner cores. The ability to precisely control the temperature of the shell forming plate with thermally cycled water provides faster thermal cycling times and allows for the temperature to be controlled independent from the temperature of the mold cavity plate. This prevents under and overcuring of the outer core layer, which can adversely affect core durability, concentricity, and manufacturing yields. As a result, the golf ball dual cores formed in accordance with the present disclosure have improved center concentricity and core durability.

Referring to FIG. 1, a mold assembly 100 for forming a dual core of a golf ball is shown. The mold assembly 100 may be used for compression molding a dual core. The mold assembly 100 has an upper section 10 and a lower section 12. The lower section 12 includes a mold cavity plate 14, for instance, a mold for forming an outer layer of the dual core. The mold cavity plate 14 has a plurality of hemispherical cavities 16 configured for receiving a preform 18. The term, "preform," as used herein refers to a rubber composition that has been extruded as an extrudate and cut into a predetermined shape, such as a cylinder, for forming a layer of the dual core. The preform 18 may be any suitable polymeric material for forming a core layer of a golf ball. For example, the preform 18 may be polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more of the foregoing. In some embodiments, the preform 18 is an uncured polybutadiene composition. For example, the concentration of polybutadiene rubber in the preform 18 is about 45 percent to about 95 percent by weight. Preferably, the polybutadiene composition includes at least 50 percent by weight, and more preferably at least 70 percent by weight, polybutadiene rubber.

The upper section 10 of the mold assembly 100 includes a shell forming plate 20. As shown in FIG. 1, the shell forming plate 20 is mounted within the mold assembly 100 and is fixedly attached to a headblock 30. The shell forming plate 20 is positioned directly above the mold cavity plate 14. Unlike conventional mold assemblies where the shell forming plate is positioned between a top cavity plate and a bottom cavity plate and has protrusions extending from both the top and bottom surfaces, the shell forming plate 20 of the present disclosure is mounted within the mold assembly 100 and includes a plurality of hemispherical protrusions 22 extending from a bottom surface 24 only. The hemispherical protrusions 22 are configured to compress the preform 18 in each of the hemispherical cavities 16 of the mold cavity plate 14 to form a hemispherical shell for the outer layer of the dual core.

Within the mold assembly 100, the shell forming plate 20 and the mold cavity plate 14 are each operatively connected to a temperature-controlled platen. The platens are thick precision machined flat plates having temperature control systems integrated therein for heat transfer directly to the respective mold plates. The platens advantageously provide the ability to create a temperature-controlled process environment. As illustrated in FIG. 1, the shell forming plate 20 is operatively coupled to a first platen 26 that is mounted directly above the shell forming plate 20. The mold cavity plate 14 is operatively coupled to a second platen 28 that is mounted directly below the mold cavity plate 14.

The first platen 26 and the second platen 28 utilize separate heating and cooling sources such that the temperatures of each of the first and second platens 26, 28 can be independently controlled. This is particularly advantageous in compression molding processes for forming dual cores because it is believed that, in order to achieve optimal curing conditions, the temperature of the shell forming plate 20 should be higher than the temperature of the mold cavity plate 14 for the curing step and subsequently reduced to a lower temperature for demolding. The independent temperature control of the first and second platens 26, 28 allows the manufacturer to modulate the temperature of the shell forming plate 20 without affecting the temperature of the mold cavity plate 14. For example, by using an independently temperature-controlled platen, the temperature of the shell forming plate 20 can be modulated such that it is higher than the temperature of the mold cavity plate 14 during the molding process and subsequently lowered to facilitate demolding.

In some embodiments, the first platen 26 utilizes a supply of liquid as a heating and cooling source. For example, the first platen 26 may utilize water as a heating and cooling source. In this embodiment, water is thermally cycled through the first platen 26 during the molding process. The first platen 26 may have an internal reservoir to receive and circulate a supply of water at the desired temperature. For instance, the first platen 26 may include a series of internally connected channels having an inlet and an outlet. Heated water may be circulated through the first platen 26 (for example, through the series of channels) to maintain the shell forming plate 20 at a predetermined, elevated temperature sufficient for curing the layer-forming material. For example, the first platen 26 should be sufficiently heated such that the shell forming plate 20 maintains a temperature of about 215° F. or less. In other embodiments, the first platen 26 should be sufficiently heated such that the shell forming plate 20 maintains a temperature of about 210° F. or less. In still other embodiments, the first platen 26 should be sufficiently heated such that the shell forming plate 20 maintains a temperature of about 205° F. or less. In yet another embodiment, the first platen 26 should be sufficiently heated such that the shell forming plate 20 maintains a temperature of about 200° F. or less. In still further embodiments, the first platen 26 should be sufficiently heated such that the shell forming plate 20 maintains a temperature ranging from about 50° F. to about 210° F. After a predetermined amount of time, the flow of the heated water can be terminated, and cooling water may be circulated through the first platen 26 to reduce the temperature of the shell forming plate 20. This prevents any overcuring of the layer-forming material within the mold and facilitates high manufacturing yields.

The use of thermally cycled water as a heating and cooling source advantageously provides more precise control over the temperature and allows for the temperature of the first platen 26 to be regulated (for example, heated and cooled) more quickly than conventional processes utilizing only electrically heated platens. For instance, by regulating the temperature of the first platen 26 with thermally cycled water, the heating and cooling cycle times for the first platen 26 are reduced by at least five percent when compared to the heating and cooling cycle times of electrically heated platens. In other embodiments, the heating and cooling cycle times for the first platen 26 are reduced by at least ten percent when compared to the heating and cooling cycle times of electrically heated platens. In still other embodiments, the heating and cooling cycle times for the first platen 26 are reduced by at least fifteen percent when compared to the heating and cooling cycle times of electrically heated platens. Indeed, thermally cycled fluids are advantageous over electrically heated platens that require active heating and passive cooling due to the ability to both actively increase and decrease process temperatures.

The second platen 28, which is coupled to the mold cavity plate 14, utilizes a heating and cooling source separate from the heating and cooling source for the first platen 26. In one embodiment, the second platen 28 utilizes a supply of water as a heating and cooling source similar to the first platen 26 described above. In some embodiments, the thermally cycled water used to heat and cool the second platen 28 is from a source separate from the source used to circulate the water to heat and cool the first platen 26. The use of thermally cycled fluids to modulate the temperature of the second platen 28 provides more precise control over the temperature of the mold cavity plate 14.

In other embodiments, the second platen 28 may be electrically heated. In this embodiment, the second platen 28 may be heated using an electrical source. For example, the second platen 28 may utilize cartridge heaters, strip heaters, split heaters, or a combination thereof, which supply heat to the platen 28. In other embodiments, the second platen 28 may utilize an induction heating device in the form of induction coils disposed within the second platen 28. However, as discussed above, electrically heated platens do not provide the same process flexibility as thermally modulated platens because of the slower thermal response time.

The second platen 28 may be heated to maintain the mold cavity plate 14 at a predetermined, elevated temperature sufficient for curing the layer-forming material. However, as described above, the temperature of the mold cavity plate 14 should be lower than the temperature of the shell forming plate 20 during the molding process. For example, the second platen 28 should be sufficiently heated such that the mold cavity plate 14 maintains a temperature of about 200° F. or less. In other embodiments, the second platen 28 should be sufficiently heated such that the mold cavity plate 14 maintains a temperature of about 195° F. or less. In still other embodiments, the second platen 28 should be sufficiently heated such that the mold cavity plate 14 maintains a temperature of about 190° F. or less. In further embodiments, the second platen 28 should be sufficiently heated such that the mold cavity plate 14 maintains a temperature of about 180° F. or less. In some embodiments, the first platen 26 and the second platen 28 are configured to heat the shell forming plate 20 and the mold cavity plate 14, respectively, during the molding process such that the mold cavity plate 14 maintains a temperature of at least about five degrees lower than the temperature of the shell forming plate 20. In other embodiments, the first and second platens 26, 28 are configured to heat the shell forming plate 20 and the mold cavity plate 14, respectively, during the molding process such that the mold cavity plate 14 maintains a temperature of at least about eight degrees lower than the temperature of the shell forming plate 20. In still other embodiments, the first and second platens 26, 28 are configured to heat the shell forming plate 20 and the mold cavity plate 14, respectively, during the molding process such that the mold cavity plate 14 maintains a temperature of at least about ten degrees lower than the temperature of the shell forming plate 20. For example, the shell forming plate 20 may maintain a temperature of about 210° F. and the mold cavity plate 14 may maintain a temperature of about 200° F. In further embodiments, the shell forming plate 20 may maintain a temperature of about 205° F. and the mold cavity plate 14 may maintain a temperature of about 195° F.

In some embodiments, when the first platen 26 and the second platen 28 are both modulated by thermally cycled fluids, the thermally cycled fluids modulate the first platen 26 and the second platen 28 such that the temperature differential between the two platens is between about 0 and 100° F. In other embodiments, the thermally cycled fluids modulate both the first platen 26 and the second platen 28 such that the temperature differential between the two platens is between about 0 and 25° F. In still other embodiments, the thermally cycled fluids modulate both the first platen 26 and the second platen 28 such that the temperature differential between the two platens is between about 5 and 20° F.

As illustrated in FIG. 1, each of the first and second platens 26, 28 are attached to an insulating board 32*a*, 32*b*. The first platen 26 is operatively attached to the top insulating board 32*a* and the second platen 28 is operatively attached to the bottom insulating board 32*b*. The insulating boards 32*a*, 32*b* are generally formed of high compressive strength, heat-resistant composite insulating material. The insulating boards 32*a*, 32*b* serve as a barrier between the first platen 26 and the headblock 30 and the second platen 28 and a bolster plate 36, respectively, to resist heat transfer.

The mold assembly 100 also includes the bolster plate 36 and a press ram 34. The bolster plate 36 is positioned between the bottom insulating board 32*b* and the press ram 34. The bolster plate 36 serves as a working surface for the press ram 34. The press ram 34 is positioned below the bolster plate 36 in the lower section 12 of the mold assembly 100. The press ram 34 is operatively attached to the mold cavity plate 14 and the second platen 28. The press ram 34 is used to press the lower section 12 of the mold assembly 100 against the upper section 10 such that the preforms 18 in the hemispherical cavities 16 of the mold cavity plate 14 compress against the hemispherical protrusions 22 on the shell forming plate 20. In one embodiment, the press ram 34 is a hydraulic ram capable of applying a pressing force of up to about 100 tons, preferably about 4 to 5 tons per cavity within the mold assembly 100. Though it will be apparent to those of ordinary skill in the art that, as the mold design warrants, the total clamp tonnage may exceed 100 tons. In some embodiments, the shell forming plate 20 may include a plurality of alignment pins (not shown) extending downward and configured for insertion into a plurality of corresponding bushings (not shown) positioned on the mold cavity plate 14 when the ram 34 is pressed. The alignment pins and corresponding bushings help to precisely align the hemispherical protrusions 22 on the shell forming plate 20 with the hemispherical cavities 16 on the mold cavity plate 14 when the press ram 34 is used to close the mold assembly 100. As will be appreciated by one of ordinary skill in the art, it is important that the shell forming plate 20 and the mold cavity plate 14 are in precise alignment to avoid any damage to the mold cavity and the layer-forming material from misaligned pins.

For exemplary purposes, FIG. 1 is illustrated herein to show a half of the mold assembly 100 (e.g., a top half having a single shell forming plate 20 and a single mold cavity plate 14). As will be apparent to those skilled in the art, during production of the dual cores, the mold assembly 100 can be configured as a double daylight press. The double daylight press generally includes an upper mold assembly operatively attached to a lower mold assembly. The upper mold assembly and the lower mold assembly each include the shell forming plate 20, the mold cavity plate 14, and the first and second platens 26, 28, as shown in FIG. 1. That is, each double daylight press includes an upper shell forming plate, an upper mold cavity plate, a lower shell forming plate, and a lower mold cavity plate. In the double daylight press, the upper and lower shell forming plates remain fixed in the press area while the pair of upper and lower mold cavity plates move in and out of the press area. This allows for the pair of mold cavity plates to be transferred from the mold assembly to a curing press and subsequently to a cooling press. Preferably at least two double daylight presses are used during production of the dual cores; however, as will be appreciated by those skilled in the art, any number of double daylight presses may be used. In still other embodiments, rather than using a double daylight press, the mold assembly can be formed as two separate but identical presses (e.g., an upper mold assembly separate from a lower mold assembly).

Figure 2:
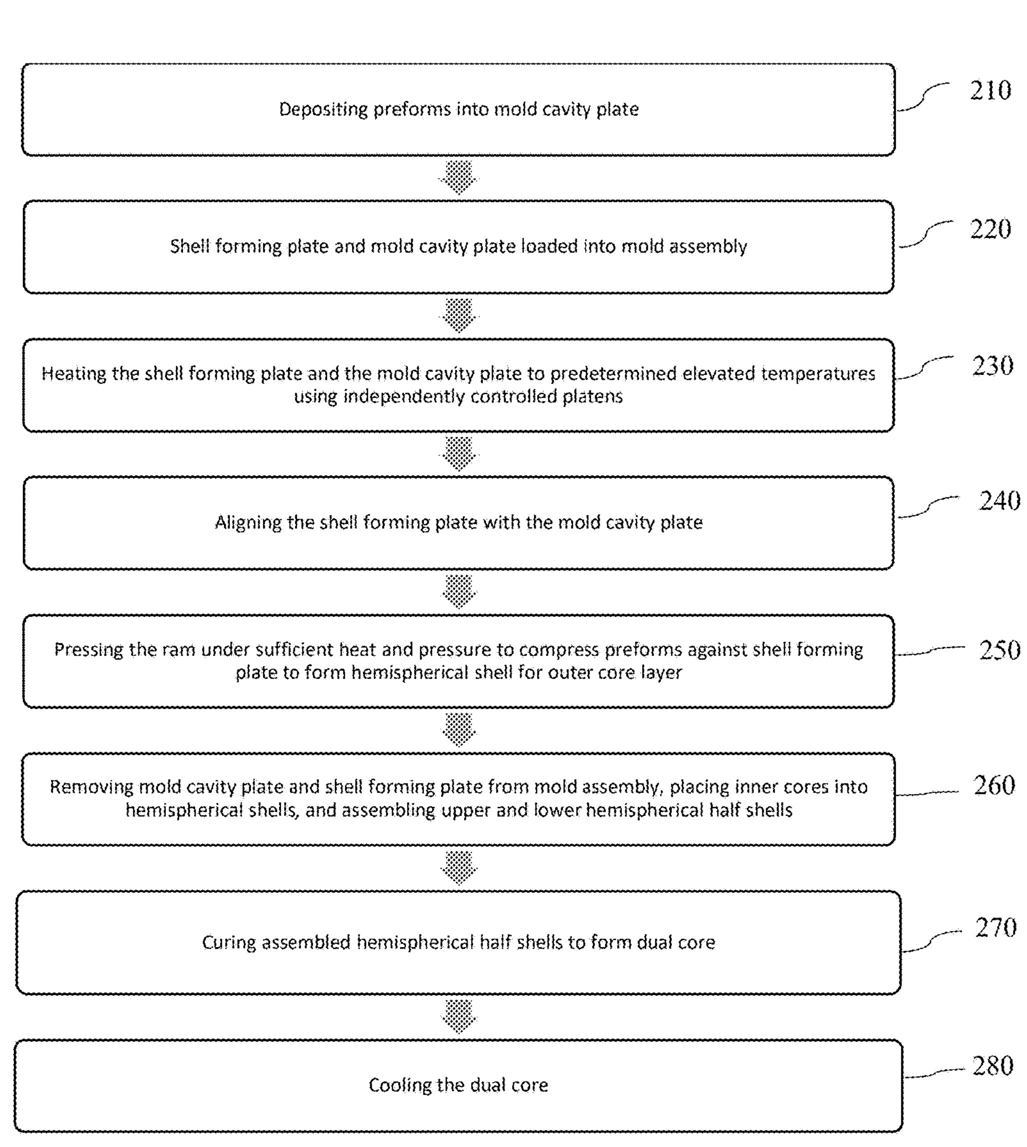
FIG. 2 is a flowchart illustrating the steps according to a method for forming a golf ball dual core in accordance with an embodiment of the present disclosure.

FIG. 2 is a flowchart showing the steps of an exemplary method 200 for forming a dual core of a golf ball using the mold assembly 100 described above. At step 210, the preforms 18 are deposited into the hemispherical cavities 16 of the mold cavity plate 14. As discussed above, the preforms 18 are composed of the layer-forming material for the upper and lower hemispherical outer core shells. In some embodiments, the method described herein may first be performed for forming lower hemispherical outer core shells. The method can then be repeated for forming upper hemispherical outer core shells that are subsequently mated with the lower hemispherical outer core shells to form an outer core layer of a dual core. After the preforms 18 are deposited into the mold cavity plate 14, the mold cavity plate 14 and the shell forming plate 20 are both loaded into the mold assembly 100 (step 220).

At step 230, the shell forming plate 20 and the mold cavity plate 14 are both heated to a predetermined, elevated temperature sufficient for curing the layer-forming material. As described above, the shell forming plate 20 and the mold cavity plate 14 are heated by the first platen 26 and the second platen 28, respectively. In some embodiments, the first platen 26 and the second platen 28 utilize separate heating sources so that the temperature of the shell forming plate 20 and the mold cavity plate 14 can be independently controlled. In this embodiment, the shell forming plate 20 can be heated to a temperature that is warmer than the temperature of the mold cavity plate 14. In some embodiments, the heating step involves heating the shell forming plate 20 via the first platen 26 to an elevated temperature of about 210° F. or less. For instance, the heating step may involve heating the shell forming plate 20 via the first platen 26 to an elevated temperature of about 205° F. or less. In further embodiments, the heating step may also involve heating the mold cavity plate 14 via the second platen 28 to an elevated temperature that is less than the elevated temperature of the shell forming plate 20. In some embodiments, the heating step involves heating the mold cavity plate 14 via the second platen 28 to an elevated temperature of at least about five degrees lower than the temperature of the shell forming plate 20, preferably at least about eight degrees lower than the temperature of the shell forming plate 20, and more preferably at least about ten degrees lower than the temperature of the shell forming plate 20.

At step 240, prior to closing the mold assembly 100, the shell forming plate 20 is aligned with the mold cavity plate 14. The alignment pins and corresponding bushings described above can be used to properly align the mold halves (i.e., the shell forming plate 20 and the mold cavity plate 14) during mating thereof. To prevent the pins from misaligning and damaging the hemispherical cavities, the mold cavity plate 14 should be in close alignment to the shell forming plate 20 before the preforms 18 contact the hemispherical protrusions 22 on the shell forming plate 20.

Once the shell forming plate 20 and the mold cavity plate 14 are properly aligned, the press ram 34 may be used to close the mold assembly 100. The press ram 34 should be pressed at a relatively fast speed to decrease the plate movement time and to increase the efficiency of the molding process. As the mold assembly 100 closes, the preforms 18 in the mold cavity plate 14 are compressed against the hemispherical protrusions 22 on the shell forming plate 20 (step 250). Under sufficient heat and pressure, the layer-forming material within the hemispherical cavities 16 is cured and compressed to a pressure sufficient to form upper hemispherical half shells for an outer layer of a dual core.

After the lower hemispherical half shells are formed, the mold cavity plate 14 (e.g., in a double daylight press, the upper and lower mold cavity plates) is removed from the mold assembly 100 and inner cores, for example, rubber inner cores, are inserted into the lower hemispherical half shells (step 260). The upper hemispherical half shells are assembled onto the lower hemispherical half shells. At step 270, the assembled hemispherical half shells are moved to a curing press for final curing. In this embodiment, the two hemispherical half shells may be cured to form a unitary outer core layer by compression molding the two hemispherical shells around the inner core layer. After curing, the mold with the cured dual cores is moved to a cooling press (step 280). After cooling, the mold is moved to a demolding station where the molded dual cores are removed.

Figure 3:
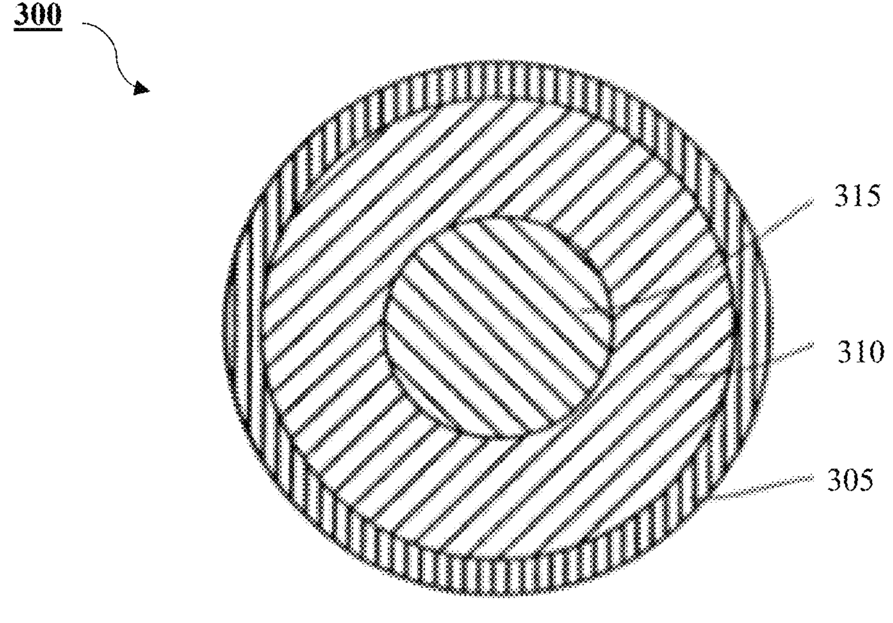
FIG. 3 is a cross-section of a golf ball having an outer core layer formed in accordance with an embodiment of the present disclosure.

The dual cores formed by the methods of the present disclosure may be assembled with a cover layer to form a golf ball. FIG. 3 shows a cross-section of an exemplary golf ball 300 that may be formed with the dual cores of the present disclosure. As shown in FIG. 3, the golf ball 300 has a cover 305 disposed over a dual core, where the dual core includes an outer core layer 310 formed by the methods of the present disclosure and an inner core layer 315. In this embodiment, the present disclosure provides golf balls including a cover layer disposed over a core layer including a spherical subassembly (e.g., the inner core layer) surrounded by an outer layer comprised of first and second compression molded half-shells formed by the methods of the present disclosure. Any conventional material may be used in preparing the golf ball cover disposed over the core. For example, as is well known in the art, ionomers, balata, and urethanes are suitable golf ball cover materials. Conventional compression and injection-molding methods can be used to form cover layers over the dual core. For example, the golf ball layers, such as the cover layers, may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. While FIG. 3 shows a three-piece golf ball with a cover disposed over a dual core, it will be appreciated by one of ordinary skill in the art that any number or type of intermediate layers may be used on the golf ball, as desired. For instance, the golf ball may be a five-piece golf ball including a dual core, an inner mantle layer, an outer mantle layer, and a cover.

The hemispherical shells formed by the methods of the present disclosure exhibit improved characteristics. For example, the mold assembly and the methods described herein are able to sufficiently form the hemispherical shells to the point where the shells have suitable rigidity but are not overcured such that the shells will not adhere to one another. By preventing overcuring, the mold assembly and the methods of the present disclosure form hemispherical half shells having improved moldability and without creating imperfections or deficiencies that would produce a non-centered subassembly when the half shells are compression molded about the subassembly. In this embodiment, the hemispherical half shells formed by the methods of the present disclosure have improved concentricity between the subassembly and outer layers once the pair of half shells are compression molded about the subassembly. As will be appreciated by one of ordinary skill in the art of golf ball manufacture (as well as the typical player), the more accurate centering of the ball results in more consistent results and an improved game.

In some embodiments, the midpoint of a dual core prepared according to the present disclosure is typically no more than about 0.02 inches from the midpoint of the golf ball center. In other words, a dual core produced by the methods of the present disclosure may be about 0.02 inches or less out of concentricity. In another embodiment, the dual cores produced by the methods of the present disclosure may be about 0.015 inches or less out of concentricity. In still another embodiment, the dual cores produced by the methods of the present disclosure may be about 0.010 inches or less out of concentricity. In yet another embodiment, the dual cores produced by the methods of the present disclosure may be about 0.005 inches or less out of concentricity.

The concentricity measurement may alternatively be expressed as a percentage of center shift relative to the outer layer thickness. For example, in one embodiment, the dual cores of the present disclosure have a center shift relative to the outer layer (or closest adjacent layer) thickness of about 8 percent or less. In another embodiment, the dual cores of the present disclosure have a center shift relative to the outer layer thickness of about 7 percent or less. In still another embodiment, the dual cores of the present disclosure have a center shift relative to the outer layer (or closest adjacent layer) thickness of about 6 percent or less. In yet another embodiment, the dual cores of the present disclosure have a center shift relative to the outer layer (or closest adjacent layer) thickness of about 5 percent or less. In still another embodiment, the dual cores of the present disclosure have a center shift relative to the outer layer (or closest adjacent layer) thickness of about 4 percent or less. For example, the dual cores of the present invention may have a center shift of about 3.5 percent or less (based on the center shift relative to the outer layer thickness).

The methods and apparatuses described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A mold assembly for forming a golf ball component, comprising:

a shell forming plate having an upper surface and a lower surface, wherein the lower surface comprises a plurality of hemispherical protrusions extending therefrom, a first platen operatively connected to the upper surface of the shell forming plate and configured to maintain the shell forming plate at a first temperature, wherein the first platen is temperature-controlled by water thermally cycled therethrough, a mold cavity plate positioned below the shell forming plate and having an upper surface and a lower surface, wherein the upper surface comprises a plurality of hemispherical cavities configured for insertion of a preform and aligned with the plurality of hemispherical protrusions, a second platen operatively connected to the lower surface of the mold cavity plate and configured to maintain the mold cavity plate at a second temperature that is lower than the first temperature, wherein the second platen is temperature-controlled by a source independent from the thermally cycled water, and a press ram operatively connected to the mold cavity plate and configured to press the mold cavity plate against the shell forming plate to form the golf ball component under sufficient heat and pressure.

2. The mold assembly of claim 1, wherein the first platen comprises an internal reservoir to receive and circulate a supply of water at a predetermined temperature.

3. The mold assembly of claim 1, wherein the first temperature is about 215° F. or less.

4. The mold assembly of claim 1, wherein the second temperature is about 200° F. or less.

5. The mold assembly of claim 1, wherein the second temperature is at least about five degrees lower than the first temperature.

6. The mold assembly of claim 1, wherein the second platen is temperature-controlled by thermally cycled water from a source independent from a source providing the thermally cycled water to the first platen.

7. The mold assembly of claim 1, wherein the golf ball component is a hemispherical half shell for an outer core layer.

8. The mold assembly of claim 1, wherein the preform is an uncured polybutadiene composition.

9. A mold assembly for forming a golf ball component, comprising:

a shell forming plate having a plurality of hemispherical protrusions extending therefrom, a first platen operatively connected to the shell forming plate and configured to maintain the shell forming plate at a first temperature, wherein the first platen is temperature-controlled by a first source of thermally cycled fluid, a mold cavity plate positioned below the shell forming plate, wherein the mold cavity plate comprises a plurality of hemispherical cavities configured for insertion of a preform, and a second platen operatively connected to the mold cavity plate and configured to maintain the mold cavity plate at a second temperature that is lower than the first temperature, wherein the second platen is temperature-controlled by a second source of thermally cycled fluid independent from the first source.

10. The mold assembly of claim 9, wherein the first temperature is about 215° F. or less and the second temperature is about 200° F. or less.

11. The mold assembly of claim 9, wherein the second temperature is at least about ten degrees lower than the first temperature.

12. The mold assembly of claim 9, wherein the preform is an uncured polybutadiene composition.

13. The mold assembly of claim 9, wherein the first platen comprises a series of channels configured to circulate the thermally cycled fluid.

14. The mold assembly of claim 9, wherein the thermally cycled fluid is water.

15. A mold assembly for forming a golf ball component, comprising:

a shell forming plate having a plurality of hemispherical protrusions extending therefrom, a first platen operatively connected to the shell forming plate and configured to maintain the shell forming plate at a first temperature, wherein the first platen is temperature-controlled by a first source, a mold cavity plate positioned below the shell forming plate, wherein the mold cavity plate comprises a plurality of hemispherical cavities configured for insertion of a preform, and a second temperature-controlled platen operatively connected to the mold cavity plate and configured to maintain the mold cavity plate at a second temperature that is lower than the first temperature, wherein the second platen is temperature-controlled by a second source independent from the first source.

16. The mold assembly of claim 15, wherein the first source is thermally cycled water.

17. The mold assembly of claim 15, wherein the second source is thermally cycled water or an electric heat source.

18. The mold assembly of claim 15, wherein the first temperature ranges from about 50° F. to about 210° F. and the second temperature ranges from about from about 50° F. to about 200° F.

19. The mold assembly of claim 15, wherein the second temperature is at least about ten degrees lower than the first temperature.

20. The mold assembly of claim 15, further comprising a press operatively connected to the mold cavity plate and configured to press the mold cavity plate against the shell forming plate to form the golf ball component under sufficient heat and pressure.

* * * * *